United States Patent [19]
Bernard

[11] 3,759,454
[45] Sept. 18, 1973

[54] DEVICE FOR WINDING CONDUCTOR WIRE ON A PIN
[75] Inventor: Jean-Pierre Bernard, Phalempin, France
[73] Assignee: Compagnie Industrielle Des Telecommunications Cit-Alcatel, Paris, France
[22] Filed: July 21, 1971
[21] Appl. No.: 165,244

[30] Foreign Application Priority Data
July 21, 1970 France .............................. 7026898

[52] U.S. Cl. ............................................ 242/7.06
[51] Int. Cl. ............................................ H01f 41/10
[58] Field of Search ................ 242/7.06, 7.17, 7.18; 140/124

[56] References Cited
UNITED STATES PATENTS
3,096,796  7/1963  Dittrich .......................... 242/7.06 X
2,682,063  6/1954  Miloche ......................... 242/7.06 X Primary Examiner—Billy S. Taylor
Attorney—Richard C. Sughrue et al.

[57] ABSTRACT

Device for winding a conductor wire on a spindle comprising a cylindrical part whose end has an edge chamfered at 45° and comprises, on the one hand, an axial bore in which the spindle is fitted and, on the other hand, a diametral guide groove so that by rotating the device, the wire is wound simultaneously around the spindle and the cylindrical part.

2 Claims, 4 Drawing Figures

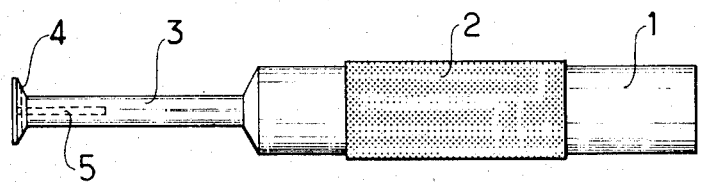
FIG.1
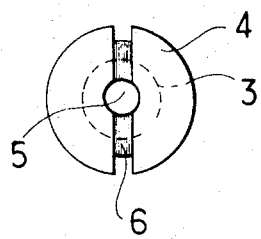
FIG.2
FIG.3
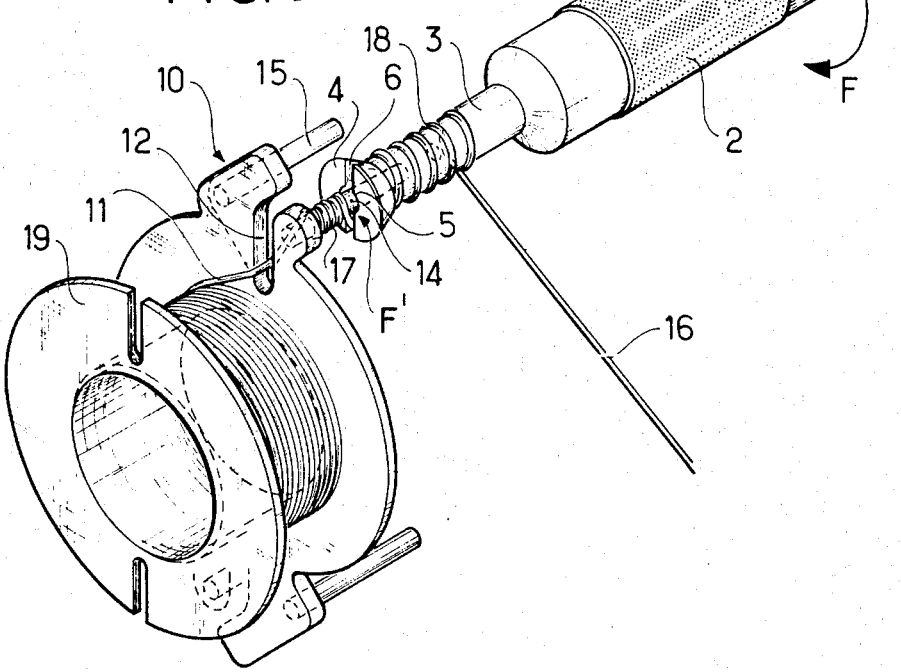
INVENTOR
JEAN-PIERRE BERNARD
BY Sughrue, Rothwell, Mion,
Zinn & Macpeak
ATTORNEYS 3,759,454

DEVICE FOR WINDING CONDUCTOR WIRE ON A PIN

BACKGROUND OF THE INVENTION

This invention relates to a device for winding a conducting wire on a pin or terminal.

In the field of electrical and electronic circuit production and cabling, the current practice is to wind conducting wires around pins or connections. For this purpose, various devices have been used, such as cabling guns, winders, and other devices that can wind a predetermined number of spirals of the conducting wire around a pin or terminal so as to make an electrical connection between the wire and the pin.

Such devices, however, involve a certain number of disadvantages.

In particular, it is necessary, after winding the wire, to separate the turns surrounding the pin from the residual wire strand. The operator generally does this by hand, using a tool such as cutting nippers whose use involves a considerable loss of time.

Furthermore, the turns thus made cannot be wound up with sufficient mutual cohesion around the pin and this leads to appreciable contact resistances which can disturb the operation of windings or circuits to which they are connected.

Moreover, such electrical connections can, after a certain period of time, be purely and simply interrupted, especially when they are integrated into apparatuses functioning in industrial environments that generate shocks and vibrations.

Also, the devices used present relatively complicated design and structure and this is generally expressed by mediocre reliability.

SUMMARY OF THE INVENTION

This invention makes it possible to correct the above disadvantages. Its purpose is to provide a simple and practical device making it possible to wind, with very high cohesion, around a pin, a predetermined number of rigorously joined conductor wire coils, then to break the wire exactly on the level of the last coil without the slightest turn-back of the latter, the device entailing a particularly reasonable cost combined with great reliability.

The purpose of the invention is a device for winding conducting wire on a pin, comprising a first cylindrical portion prolonged by a second coaxial cylindrical portion presenting a diameter as well as a length considerably smaller than the diameter and the length of the first cylindrical portion, and an axial housing for receiving the pin being machined on one end of the second cylindrical portion. The one end of the second cylindrical portion has, on the one hand, an edge chamfered along an angle essentially equal to 45° and, on the other hand, a diametral conducting wire guide groove. As a result of the rotation of the device, the conducting wire is simultaneously wound up in the form of an equal number of coils around the pin and around the second cylindrical portion.

BRIEF DESCRIPTION OF THE DRAWINGS

Other features and advantages of the invention will emerge from the following specification by way of a purely illustrative and by no means restrictive example with reference to the attached drawings and diagrams where:

FIG. 1 represents an elevational view of the device according to the present invention;

FIG. 2 represents a large-scale view of one end portion of the device according to the present invention;

FIG. 3 is a perspective view illustrating the operation of the device according to the present invention.

DESCRIPTION OF THE PREFERRED EMBODIMENTS

Figure 4:
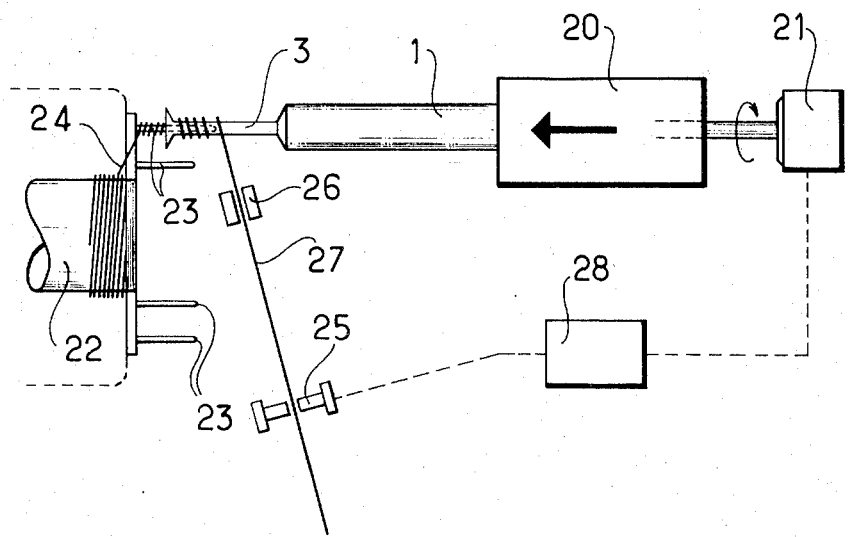
FIG. 4 is a schematic representation of a machine equipped with a device according to the present invention.

As illustrated in FIG. 1, the device for winding conducting wire on a pin comprises a first cylindrical portion 1 which is advantageously milled on a portion 2 of its surface.

This first portion 1 is prolonged by a second coaxial cylindrical portion 3, presenting a diameter as well as a length on the order of one half of that of the first portion. The end of the second portion 3 involves an edge 4 which is preferably chamfered essentially at 45° and it also presents, on the one hand, an axial borehole 5 adapted to receive the pin and, on the other hand, a diametral groove 6, shown more particularly in FIG. 2.

Furthermore, the diameter of the second cylindrical portion 3 is predetermined as a function of the diameter of the pin, on the one hand, and the diameter of the conducting wire, on the other hand.

FIG. 3 illustrates the operation of the device of the present invention. In this figure, there is shown an end 10 of a frame or reel 19 on which there is wound the conducting wire whose outcoming strand 11 passes through the slot 12 and is intended to be wound around a pin 14 with dimensions essentially equal to that of the neighboring pin 15 mounted on the end 10.

FIG. 3 shows the final result obtained by using the device according to the present invention. For this purpose, the pin 14 is introduced into the borehole 5 of the end 4 of the device, and the strand 11 is positioned in the groove 6 of the end 4. Then the operator, on the one hand, holds the device in one hand by means of its cylindrical portion 1 and, on the other hand, holds the wire strand 16 between the thumb and index finger of the other hand. He then rotates the tool in the direction indicated by arrow F while allowing the wire strand 16 to slide between his fingers. From this rotation, the conducting wire is wound simultaneously around pin 14 and around the second cylindrical portion 3 of the device and this is accomplished in an equal number of coils or turns 17 and 18 on these two members, respectively. When the desired number of turns has been made around the pin 14, the operator stops the wire strand 16 between his fingers while continuing to rotate the device, on the one hand, and while pushing it slightly forward, on the other hand. From this we get a neat break of the wire on the level of the last coil 17, at the point indicated by arrow F' in FIG. 3, without the slightest turn-back of the end of the wire thus broken. Furthermore, the penetration of the tool forwardly enables us to obtain closely adjacent turns or coils which, in turn, enables us to insure excellent electrical contact between the wire and the pin.

Hereinabove, there has been described one example of manually handling the device that is the object of this invention. Of course, such a device can be entirely automated, as shown schematically in FIG. 4. Thus, the above-described device is shown in FIG. 4 as being attached to one end of a drum 20 which can be rotated and which can be moved in translation by means of motor 21. There is also shown the frame 22 of a circuit attached to a support (not shown) and involving pins 23 around which conducting wire 24 must be wound, a member 26 advantageously providing for the guidance of the strand 27 coming out of the second cylindrical portion 3 of the device.

Futhermore, a variable-spacing device 25, on the one hand, alsoprovides for the guidance of the strand 27 and its progressive tightening, leading to the rupture of the wire wound up on pin 24, and this is accomplished in the manner described above.

Of course, a programming device 28, known in itself, makes it possible to servo-control the motor 21 and the member 25 so that a predetermined number of turns or coils may be placed around the pin 23.

The device that is the object of the invention here can be used in all cases where connections must be accomplished by winding wire around pins.

Of course, the invention is by no means limited to the manner of implementation described and illustrated here which was given only by way of example. In particular, one can, without going beyond the framework of the invention, introduce detail modifications, change certain arrangements, or replace certain means by equivalent means.

I claim:

1. A device for attaching the free end of an electrical lead to a terminal pin by tightly winding the lead around the pin, said device comprising:

a spindle having a wire engaging surface flared to an end to form a frusto-conical flange tapering away from said end, edge surface defining a diametral slot extending across the end face of the flange to receive the lead, and an axial passage extending inwardly from said end face within said spindle to partially receive the pin, whereby; rotation of said spindle relative to said pin causes simultaneous lead wrapping of the exposed surface of said pin and said wire receiving surface of said spindle rearwardly of said frusto-conical flange and automatic severance of said lead at said slot edge surface upon restricting further movement of the free end of the lead while continuing said rotation.

2. A device as claimed in claim 1 wherein the diameter of the spindle rearwardly of said flange is substantially greater than the diameter of said axial passage to insure severance of said lead at the slot edge adjacent said end face.

* * * * *